United States Patent
Choi et al.

(10) Patent No.: US 12,192,809 B2
(45) Date of Patent: Jan. 7, 2025

(54) METHOD AND APPARATUS FOR MONITORING SIGNALS IN A WIRELESS COMMUNICATION SYSTEM

(71) Applicant: LG Electronics Inc., Seoul (KR)

(72) Inventors: Seunghwan Choi, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 365 days.

(21) Appl. No.: 17/713,762

(22) Filed: Apr. 5, 2022

(65) Prior Publication Data

US 2022/0322117 A1    Oct. 6, 2022

Related U.S. Application Data

(60) Provisional application No. 63/171,076, filed on Apr. 5, 2021.

(30) Foreign Application Priority Data

Sep. 30, 2021    (KR) .................. 10-2021-0130341

(51) Int. Cl.
*H04W 24/00* (2009.01)
*H04L 27/26* (2006.01)
*H04W 24/08* (2009.01)
*H04W 72/0446* (2023.01)
*H04W 72/23* (2023.01)

(52) U.S. Cl.
CPC ....... *H04W 24/08* (2013.01); *H04L 27/26025* (2021.01); *H04W 72/0446* (2013.01); *H04W 72/23* (2023.01)

(58) Field of Classification Search
CPC . H04W 24/08; H04W 72/0446; H04W 72/23; H04L 27/26025; H04L 27/2602; H04L 5/0053; H04L 5/0007
USPC .......................................... 370/329; 455/312
See application file for complete search history.

(56) References Cited

U.S. PATENT DOCUMENTS

2019/0104477 A1* 4/2019 MolavianJazi ....... H04W 16/28
2019/0253308 A1    8/2019 Huang et al.

FOREIGN PATENT DOCUMENTS

KR    20200018397    2/2020
WO    WO2020032868    2/2020

OTHER PUBLICATIONS

International Search Report in International Appln. No. PCT/KR2022/004651, dated Jul. 6, 2022, 9 pages.
Nokia & Nokia Shanghai Bell, "PDCCH monitoring enhancements," R1-2100258, Presented at 3GPP TSG RAN WG1 #104-e, e-Meeting, Jan. 25-Feb. 5, 2021, 5 pages.

(Continued)

*Primary Examiner* — Marcos Batista
(74) *Attorney, Agent, or Firm* — Fish & Richardson P.C.

(57) ABSTRACT

A method and apparatus for monitoring a signal in a wireless communication system disclosed herein may perform multi-slot physical downlink control channel (PDCCH) monitoring for a subcarrier spacing (SCS) of 480 kHz or 960 kHz. The multi-slot PDCCH monitoring refers to PDCCH monitoring configured to include a slot interval between PDCCH monitoring occasions in consideration of an increase in a user equipment (UE) burden when monitoring a PDCCH in consecutive slots.

15 Claims, 9 Drawing Sheets

(56) References Cited

OTHER PUBLICATIONS

Qualcomm Incorporated, "FL summary for initial access signals and channels for NR-U," R1-2006993, Presented at 3GPP TSG RAN WG1 Meeting #102-e, Aug. 17-24, 2020, 12 pages.

3GPP TR 38.808 V17.0.0 (Mar. 2021), 3rd Generation Partnership Project Technical Specification Group Access Network, Study on supporting NR from 52.6 GHz to 71 GHz (Release 17), Mar. 2021, 161 pages.

Lenovo, "Feature lead summary #3 for [104-e-NR-52-71GHz-02] on PDCCH monitoring enhancements," R1-2102242, 3GPP TSG RAN WG1, Meeting #104-e, e- Meeting, Jan. 25-Feb. 5, 2021, 113 pages.

Office Action in Korean Appln. No. 10-2023-7028633, mailed on Mar. 27, 2024, 8 pages (with English translation).

Intel Corporation, "Discussion on initial accessaspects for extending NR up to 71 GHz," 3GPP TSG RAN WG1, Meeting #104-e, e-Meeting, Jan 25-Feb. 5, 2021, 8 pages.

Office Action in Japanese Appln. No. 2023-561180, mailed on Sep. 3, 2024, 7 pages (with English translation).

\* cited by examiner

METHOD AND APPARATUS FOR MONITORING SIGNALS IN A WIRELESS COMMUNICATION SYSTEM

CROSS-REFERENCE TO RELATED APPLICATIONS

This application claims the benefit of an earlier filing date and right of priority to U.S. Provisional Application No. 63/171,076, filed on Apr. 5, 2021, and Korean Patent Application No. 10-2021-0130341, filed on Sep. 30, 2021. The disclosures of the prior applications are hereby incorporated by reference herein in their entirety.

TECHNICAL FIELD

The present disclosure relates to a method and apparatus for use in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

An object of the present disclosure is to provide a signal monitoring method for efficiently monitoring a control signal in a wireless communication system and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for monitoring a signal in a wireless communication system.

In an aspect of the present disclosure, there is provided a method of monitoring a control signal by a user equipment (UE) operating in a wireless communication system. The method may include: configuring a synchronization signals and physical broadcast channel (SS/PBCH) block and control resource set (CORESET) multiplexing pattern as pattern 1; and based on pattern 1, monitoring a physical downlink control channel (PDCCH) in a Type0-PDCCH common search space (CSS) set over two slots. A slot interval between the two slots may be 4 slots based on a 480 kHz subcarrier spacing (SCS) and 8 slots based on a 960 kHz SCS.

In other aspects of the present disclosure, an apparatus, a processor and a storage medium for performing the signal monitoring method are provided.

The communication apparatus may include an autonomous driving vehicle communicable with at least a UE, a network, and another autonomous driving vehicle other than the communication apparatus.

The above-described aspects of the present disclosure are only some of the preferred embodiments of the present disclosure, and various embodiments reflecting the technical features of the present disclosure may be derived and understood from the following detailed description of the present disclosure by those skilled in the art.

According to an embodiment of the present disclosure, when communication devices monitor control signals, the communication devices may perform more efficient signal monitoring based on operations different from those in the prior art.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP technical specification (TS) 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP NR

Figure 1:
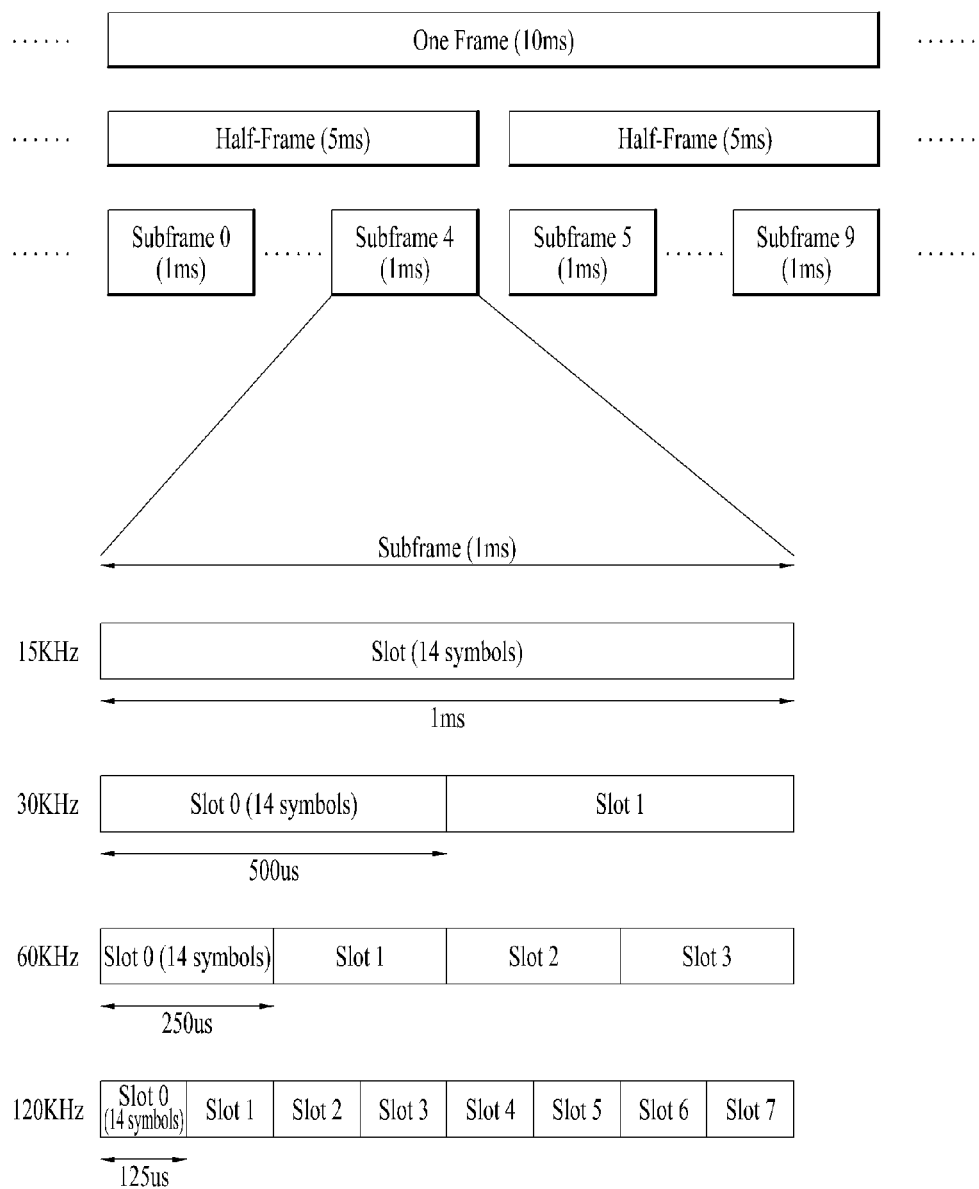
FIG. 1 illustrates a radio frame structure.

- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

\* $N^{slot}_{symb}$: number of symbols in a slot
\* $N^{frame, u}_{slot}$: number of slots in a frame
\* $N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 2:
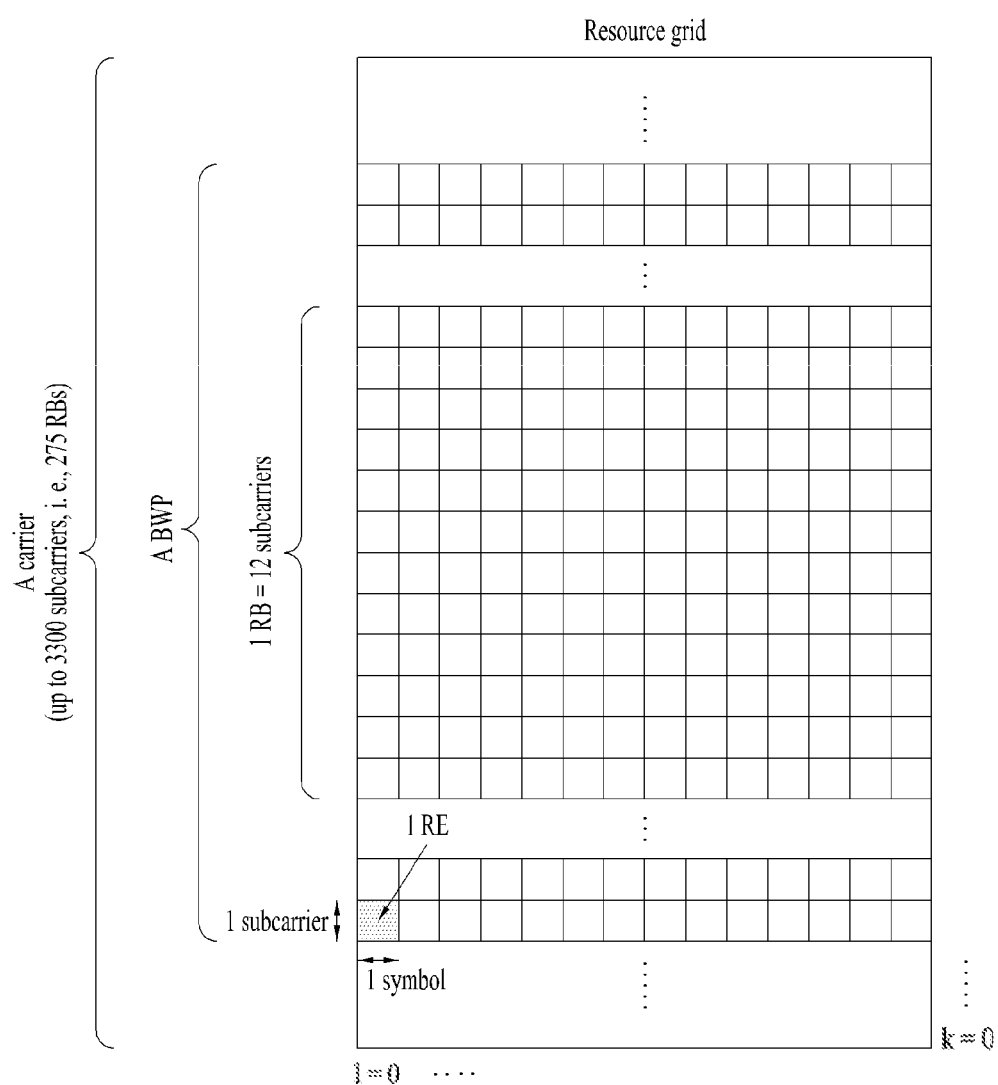
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A plurality of RB interlaces (simply, interlaces) may be defined in the frequency domain. Interlace m∈{0, 1, . . . , M−1} may be composed of (common) RBs {m, M+m, 2M+m, 3M+m, . . . }. M denotes the number of interlaces. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a user equipment (UE) receives information from a base station (BS) in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

Figure 3:
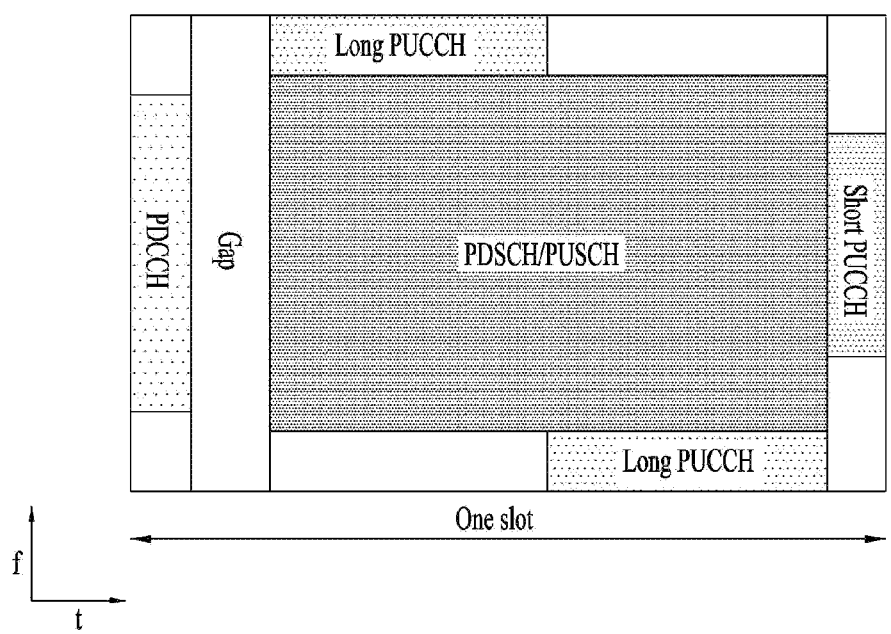
FIG. 3 illustrates a self-contained slot structure.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a BS may be, for example, a gNode B (gNB).

DL Physical Channel/Signal (1) PDSCH

A PDSCH carries DL data (e.g., DL-shared channel transport block (DL-SCH TB)). The TB is coded into a codeword (CW) and then transmitted after scrambling and modulation processes. The CW includes one or more code blocks (CBs). One or more CBs may be grouped into one code block group (CBG). Depending on the configuration of a cell, the PDSCH may carry up to two CWs. Scrambling and modulation may be performed for each CW, and modulation symbols generated from each CW may be mapped to one or more layers. Each layer may be mapped to resources together with a DMRS after precoding and transmitted on a corresponding antenna port. The PDSCH may be dynamically scheduled by a PDCCH (dynamic scheduling). Alternatively, the PDSCH may be semi-statically scheduled based on higher layer (e.g., RRC) signaling (and/or Layer 1 (L1) signaling (e.g., PDCCH)) (configured scheduling (CS)). Therefore, in the dynamic scheduling, PDSCH transmission is accompanied by the PDCCH, whereas in the CS, PDSCH transmission may not be accompanied by the PDCCH. The CS may include semi-persistent scheduling (SPS).

(2) PDCCH

A PDCCH carries Downlink Control Information (DCI). For example, the PDCCH (i.e., DCI) may carry: transmission formats and resource allocation of a DL-SCH; frequency/time resource allocation information on an uplink shared channel (UL-SCH); paging information on a paging channel (PCH); system information on a DL-SCH; time/frequency resource allocation information on a higher layer control message such as a random access response (RAR) transmitted over a PDSCH; transmit power control commands; and information on activation/deactivation of SPS/CS. Various DCI formats may be provided depending on information in DCI.

Table 4 shows DCI formats transmitted over the PDCCH.

TABLE 4

| DCI format | Usage |
| --- | --- |
| 0_0 | Scheduling of PUSCH in one cell |
| 0_1 | Scheduling of one or multiple PUSCH in one cell, or indicating downlink feedback information for configured grant PUSCH (CG-DFI) |
| 1_0 | Scheduling of PDSCH in one cell |
| 1_1 | Scheduling of PDSCH in one cell, and/or triggering one shot HARQ-ACK codebook feedback |
| 2_0 | Notifying a group of UEs of the slot format, available RB sets, COT duration and search space set group switching |

TABLE 4-continued

| DCI format | Usage |
| --- | --- |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a CBG-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 may be used to provide dynamic slot format information (e.g., dynamic SFI) to the UE, and DCI format 2_1 may be used to provide downlink pre-emption information to the UE. UEs defined as one group may be provided with DCI format 2_0 and/or DCI format 2_1 over a group common PDCCH, which is a PDCCH defined for a group of UEs.

The PDCCH/DCI may include a cyclic redundancy check (CRC), and the CRC may be masked/scrambled with various identifiers (e.g., radio network temporary identifier (RNTI)) according to the owner or purpose of the PDCCH. For example, if the PDCCH is for a specific UE, the CRC may be masked with a cell-RNTI (C-RNTI). If the PDCCH relates to paging, the CRC may be masked with a paging-RNTI (P-RNTI). If the PDCCH relates to system information (e.g., system information block (SIB)), the CRC may be masked with a system information RNTI (SI-RNTI). If the PDCCH relates to a random access response, the CRC may be masked with a random access-RNTI (RA-RNTI).

Table 5 shows the usage of the PDCCH and transport channels according to the type of RNTI. Here, the transport channel means a transport channel related to data carried by a PDSCH/PUSCH scheduled by the PDCCH.

TABLE 5

| RNTI | Usage | Transport Channel |
| --- | --- | --- |
| P-RNTI | Paging and System Information change notification | PCH(Paging Channel) |
| SI-RNTI | Broadcast of System Information | DL-SCH |
| RA-RNTI | Random Access Response | DL-SCH |
| Temporary C-RNTI | Contention Resolution (when no valid C-RNTI is available) | DL-SCH |
| Temporary C-RNTI | Msg3 transmission | UL-SCH |
| C-RNTI, MCS(Modulation and Coding Scheme)-C-RNTI | Dynamically scheduled unicast transmission | UL-SCH |
| C-RNTI | Dynamically scheduled unicast transmission | DL-SCH |
| MCS-C-RNTI | Dynamically scheduled unicast transmission | DL-SCH |
| C-RNTI | Triggering of PDCCH ordered random access | N/A |
| CS(Configured Scheduling)-RNTI | Configured scheduled unicast transmission (activation, reactivation and retransmission) | DL-SCH, UL-SCH |

TABLE 5-continued

| RNTI | Usage | Transport Channel |
|---|---|---|
| CS-RNTI | Configured scheduled unicast transmission (deactivation) | N/A |
| TPC(Transmit Power Control)-PUCCH-RNTI | PUCCH power control | N/A |
| TPC-PUSCH-RNTI | PUSCH power control | N/A |
| TPC-SRS-RNTI | SRS trigger and power control | N/A |
| INT(Interruption)-RNTI | Indication pre-emption in DL | N/A |
| SFI(Slot Format Indication)-RNTI | Slot Format Indication on the given cell | N/A |
| SP(Semi-persistent)-CSI(Channel State Information)-RNTI | Activation of Semi-persistent CSI reporting on PUSCH | N/A |

For the PDCCH, a fixed modulation scheme may be used (e.g., quadrature phase shift keying (QPSK)). One PDCCH may include 1, 2, 4, 8, or 16 control channel elements (CCEs) depending on the aggregation level (AL). One CCE may include 6 resource element groups (REGs), and one REG may be defined by one OFDMA symbol and one (P)RB.

The PDCCH may be transmitted in a control resource set (CORESET). The CORESET corresponds to a set of physical resources/parameters used to carry the PDCCH/DCI within a BWP. For example, the CORESET may include a set of REGs with a given numerology (e.g., SCS, CP length, etc.). The CORESET may be configured by system information (e.g., MIB) or UE-specific higher layer (e.g., RRC) signaling. For example, the following parameters/information may be used to configure the CORESET. One UE may be configured with one or more CORESETs, and a plurality of CORESETs may overlap in the time/frequency domain.
  controlResourceSetId: this parameter/information indicates the identifier (ID) of the CORESET.
  frequencyDomainResources: this parameter/information indicates frequency-domain resources of the CORESET. The frequency-domain resources may be indicated by a bitmap, and each bit corresponds to an RB group (=6 consecutive RBs). For example, the most significant bit (MSB) of the bitmap corresponds to the first RB group in the BWP. An RB group corresponding to a bit with a value of 1 may be allocated as a frequency-domain resource of the CORESET.
  duration: this parameter/information indicates time-domain resources of the CORESET. The parameter/information duration may indicate the number of consecutive OFDMA symbols included in the CORESET. For example, duration has a value of 1-3.
  cce-REG-MappingType: this parameter/information indicates a CCE-to-REG mapping type. An interleaved type and a non-interleaved type may be supported.
  precoderGranularity: this parameter/information indicates a precoder granularity in the frequency domain.
  tci-StatesPDCCH: this parameter/information indicates information (e.g., TCI-StateID) on a transmission configuration indication (TCI) state for the PDCCH. The TCI state may be used to provide a quasi-co-location (QCL) relationship between DL RS(s) in an RS set (TCI-state) and a PDCCH DMRS port.
  tci-PresentInDCI: this parameter/information indicates whether a TCI field is included in DCI.
  pdcch-DMRS-ScramblingID: this parameter/information indicates information used for initialization of a PDCCH DMRS scrambling sequence.

For PDCCH reception, the UE may monitor (e.g., blind decoding) a set of PDCCH candidates in the CORESET. The PDCCH candidate may mean CCE(s) monitored by the UE for PDCCH reception/detection. PDCCH monitoring may be performed in one or more CORESETs in an active DL BWP on each active cell in which the PDCCH monitoring is configured. The set of PDCCH candidates monitored by the UE may be defined as a PDCCH search space (SS) set. The SS set may be classified into a common search space (CSS) set or a UE-specific search space (USS) set.

Table 6 shows PDCCH search spaces.

TABLE 6

| Search Space | Type | RNTI | Use Case |
|---|---|---|---|
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MCS-C-RNTI or CS-RNTI | UE signaling (e.g., PDSCH/PUSCH) |

The SS set may be configured by system information (e.g., MIB) or UE-specific higher layer (e.g., RRC) signaling. S (e.g., 10) SS sets or less may be configured in each DL BWP of a serving cell. For example, the following parameters/information may be provided for each SS set. Each SS set may be associated with one CORESET, and each CORESET configuration may be associated with one or more SS sets.
  searchSpaceId: this parameter/information indicates the ID of the SS set.
  controlResourceSetId: this parameter/information indicates the CORESET associated with the SS set.
  monitoringSlotPeriodicityAndOffset: this parameter/information indicates a PDCCH monitoring periodicity (in a unit of slot) and a PDCCH monitoring offset (in a unit of slot)
  monitoringSymbolsWithinSlot: this parameter/information indicates first OFDMA symbol(s) for PDCCH monitoring in a slot in which the PDCCH monitoring is configured. The first OFDMA symbol(s) are indicated by a bitmap, and each bit corresponds to each OFDMA symbol in the slot. The MSB of the bitmap corresponds to the first OFDM symbol in the slot. OFDMA symbol(s) corresponding to bit(s) with a value of 1 corresponds to the first symbol(s) in the CORESET in the slot.
  nrofCandidates: this parameter/information indicates the number of PDCCH candidates (e.g., one of 0, 1, 2, 3, 4, 5, 6, and 8) for each AL (where AL={1, 2, 4, 8, 16}).
  searchSpaceType: this parameter/information indicates whether the SS type is the CSS or USS.
  DCI format: this parameter/information indicates the DCI format of a PDCCH candidate.

The UE may monitor PDCCH candidates in one or more SS sets in a slot according to the configuration of the CORESET/SS set. An occasion (e.g., time/frequency resource) to monitor PDCCH candidates is defined as a PDCCH (monitoring) occasion. One or more PDCCH (monitoring) occasions may be configured within a slot.

1. Multi-Slot PDCCH Monitoring

The above contents are applicable in combination with methods proposed in the present disclosure, which will be described later. Alternatively, the contents may clarify the technical features of the methods proposed in the present disclosure.

In addition, the following methods may be equally applied to the above-described NR system or shared spectrum (licensed bands). Thus, it is obvious that the terms, expressions, and structures in this document may be modified to be suitable for the system in order to implement the technical idea of the present disclosure in the corresponding system.

The NR system supports various numerologies (or SCSs) to provide various 5G services. For example, the NR system may support a wide area in conventional cellular bands with an SCS of 15 kHz and support a dense urban area and a wide carrier bandwidth with lower latency with an SCS of 30/60 kHz. For an SCS above 60 kHz, NR may support a bandwidth of 24.25 GHz or higher. According to Release 16, NR frequency bands are divided into two frequency ranges (FR1 and FR2), which may be configured as shown in Table 3. In addition, discussions are ongoing to support future NR systems operating above frequency bands defined in FR1/FR2 (for example, 52.6 GHz to 71 GHz).

Frequency bands above FR1 and FR2 (e.g., bands from 52.6 GHz to 114.25 GHz, and more particularly, bands from 52.6 GHz to 71 GHz) may be referred to as FR2-2. The waveforms, SCSs, CP lengths, timings, etc. defined for FR1 and FR2 in the current NR system may not be applied to FR2-2.

An SCS of 120, 480, or 960 kHz may be used for NR operation in bands above 52.6 GHz. For the 480 or 960 kHz SCS, the length of an OFDM symbol becomes shorter than that of the 120 kHz SCS (e.g., ¼ times for 480 kHz and ⅛ times for 960 kHz), and such symbol and slot lengths may be a burden for the UE to perform PDCCH monitoring in each slot. In addition, multi-slot PDCCH monitoring is expected to be introduced for power saving. The present disclosure proposes methods of reducing the PDCCH monitoring burden of the UE in the above situation and/or operation/configuration methods that need to be considered for the multi-slot PDCCH monitoring.

1.1. Method of Configuring/Indicating Slot Including PDCCH Monitoring Occasion for Type0-PDCCH CSS Set for First Configuration (SS/PBCH Block and CORESET Multiplexing Pattern 1)

If the UE is configured with a CORESET for a Type0-PDCCH CSS set by a master information block (MIB) during a cell search process, the UE may determine relevant information including the number of RBs and symbols in the CORESET and a PDCCH monitoring occasion based on controlResourceSetZero and searchSpaceZero of pdcch-ConfigSIB1, which is an RRC information element (IE), and based on related tables (e.g., tables in 3GPP TS 38.213). According to Clause 13 of 3GPP TS 38.213, an SS/PBCH block and CORESET multiplexing pattern may be set as one of patterns 1 to 3 based on Tables 13-1 to 13-10C. When the SS/PBCH block and CORESET multiplexing pattern is SS/PBCH block and CORESET multiplexing pattern 1 (hereinafter pattern 1), the PDCCH monitoring occasion (MO) may be determined as a configurable pattern based on an offset O and a step index M. In addition, an MO is located in two consecutive slots (i.e., slot index $n_0$ and index $n_0+1$) for an index i of each SS/PBCH block (SSB), where $n_0$ is determined by $n_0 = (O \cdot 2^\mu + \lfloor t \cdot M \rfloor) \bmod N_{slot}^{frame,\mu}$. In addition, $\mu$ denotes a numerology for PDCCH reception in a CORESET, and $N_{slot}^{frame,\mu}$ is the number of slots per frame for the SCS configuration $\mu$. The values of O and M may be determined from Tables 13-11 to 13-12A of 3GPP TS 38.213. The operation of Section 1.1 may be performed in both a licensed band (operation without shared spectrum) and/or an unlicensed band (operation with shared spectrum).

For SS/PBCH block and CORESET multiplexing pattern 2 (hereinafter pattern 2) and SS/PBCH block and CORESET multiplexing pattern 3 (hereinafter pattern 3), the operations proposed in this specification may not be used.

For NR operating above 52.6 GHz, it is expected that the 120, 480 and 960 kHz SCSs will be introduced for control/data channels including a PDCCH. For a large SCS (e.g., 480 and 960 kHz), since symbol and slot lengths become short, the UE may have a burden in monitoring two consecutive slots. Therefore, the UE may perform PDCCH monitoring for each SSB index in two consecutive slot groups as in Method 1.1-1 to be described below, instead of performing the PDCCH monitoring in two consecutive slots as in the prior art.

1.1-1. Method of Determining Type0-PDCCH Monitoring Slot

A slot group including a plurality of consecutive slots may be defined. Type0-PDCCH monitoring may be performed in the first slots of two consecutive slot groups. A slot group may include G consecutive slots starting from slot $n_0$. G may be determined for each slot group according to the numerology of an SSB and/or CORESET. Alternatively, G may be configured and/or indicated to the UE through the MIB or SIB1. The default value of G may be predefined according to the numerology of the SSB and/or CORESET. For example, if the SCS of the CORESET is 120 kHz, G may be determined as 1 (G=1), and if the SCS is 480 or 960 kHz, G may be determined as 4 (G=4). Alternatively, to match the slot group length with the slot length for the 120 kHz SCS, G may be determined as 4 (G=4) when the SCS is 480 kHz or 8 (G=8) when the SCS is 960 kHz. If the value of G configured/indicated by the MIB or SIB1 is unavailable (e.g., during the initial access), the default value may be used. After reception of the MIB or SIB1, the value of G may be updated from the default value to the value indicated by the MIB or SIB1.

The slot group may be understood as a virtual concept representing consecutive slots. In other words, the value of G may be equivalent to an interval between slots in which Type0-PDCCH monitoring is performed. For example, the indices of Type0-PDCCH monitoring slots may be $n_0$ and $n_0+G$. Accordingly, when the SCS is 480 kHz (i.e., when $\mu=5$), the indices of Type0-PDCCH monitoring slots may be $n_0$ and $n_0+4$. When the SCS is 960 kHz (i.e., when $\mu=6$), the indices of Type0-PDCCH monitoring slots may be $n_0$ and $n_0+8$. Considering that the maximum number of monitored PDCCH candidates per unit time (e.g., group of slots) for a single serving cell and the maximum number of non-overlapped CCEs per unit time (e.g., group of slots) for a single serving cell are configured depending on UE capability, a monitoring interval of G needs to be maintained so that PDCCH monitoring may be performed without a burden on the UE (for example, without exceeding the maximum number of PDCCH candidates and/or the maximum number of CCEs).

1.2. Method of Defining (Determining) MO Span for Multi-Slot PDCCH Monitoring Multi-slot PDCCH monitoring refers to an operation in which PDCCH monitoring is performed by determining a blind decoding (BD)/CCE limit based on and/or in units of a plurality of consecutive slots. In conventional NR rel-15, the BD/CCE limit is determined in units of one slot. In NR PDCCH monitoring is performed after determining the BD/CCE limit in units of spans (i.e., consecutive symbols) each confined within one slot. The BD/CCE limit refers to the "maximum number of monitored PDCCH candidates for a DL BWP with SCS configuration for a single serving cell" and the "maximum number of non-overlapped CCEs for a DL BWP with SCS configuration for a single serving cell" described in the 3GPP TS. In conventional NR rel-15/16, a span is defined as consecutive PDCCH MOs, which may be defined as consecutive symbols within a slot.

To avoid PDCCH monitoring from being executed too frequently due to short symbol and slot lengths in bands above 52.6 GHz, multi-slot PDCCH monitoring may be introduced as described in Section 1.1. To meet this purpose, it is necessary to define a PDCCH monitoring span in units of slots (i.e., in units of a plurality of slots).

1.2-1. Definition of Slot-Level Span for Multi-Slot PDCCH Monitoring

A PDCCH monitoring span is defined as a group of (consecutive) slots including at least one PDCCH MO. In other words, the proposed slot-level span is defined in the form of consecutive slots, and each slot has at least one MO. More specific characteristics of the slot-level span could be explained according to multi-slot PDCCH monitoring methods in the following two cases.

TABLE 7

- Case 1: Use a fixed pattern of slot groups as the baseline to define the new capability.
① Each slot group consists of X slots
② Slot groups are consecutive and non-overlapping
③ The capability indicates the BD/CCE limit within Y consecutive [symbols or slots] in each slot group
④ Y < X or Y = X
- Case 2: Use an (X, Y) as the baseline to define the new capability
① X is the minimum time separation between the start of two consecutive spans
② The capability indicates the BD/CCE limit within a span of at most Y consecutive [symbols or slots]
③ Y < X or Y = X

1.2-1-1. Span in Case 1

The contents of Section 1.2-1-1 are limited to a case where the unit of Y in Case 1 is a slot. The span is defined as Y consecutive slots. The BD/CCE limit is determined at the span level. At least one span is included in X slots. A slot including the first (lowest index) MO among PDCCH MOs in the X slots becomes the starting slot of the first span, and the corresponding span is determined by consecutive slots as long as the span duration. The next span starts from a slot including the lowest index MO which is not included in the previous span. For a plurality of spans existing within the X slots, the span duration may be determined to be the same or may be determined without special restrictions. All spans do not overlap with each other and do not cross the boundaries of the X slots. The (minimum) interval between adjacent spans may be semi-statically configured by RRC signaling, etc.

1.2-1-2. Span in Case 2

The contents of Section 1.2-1-2 are limited to a case where the unit of Y in Case 2 is a slot. The span is defined as Y consecutive slots. The BD/CCE limit is determined at the span level. A maximum of one span may be included in X slots. X denotes a minimum slot offset between two adjacent spans (i.e., an interval between first slots of two spans), and Y denotes a maximum interval of a span (i.e., the maximum number of slots).

In Sections 1.3 and 1.4 to be described below, various configuration/indication methods for the BS/UE in Case 1 or Case 2 will be described.

1.3. Case 1

1.3.1. X-Slot Group
1.3.1.1. The starting point of an X-slot group may be determined for each UE according to one of the following methods.
1.3.1.1.1. Method of determining starting point of X-slot group based on system frame number (SFN)
1.3.1.1.1.1. A point at which SFN modulo c=0 is determined as the starting point of the X-slot group, where c may be semi-statically configured by RRC signaling, etc. The default value of c may be predefined for each SCS. For example, for the 960 kHz SCS, the default value of c may be 8.
1.3.1.1.1.2. A point at which SFN=d is determined as the starting point of X slots, and the slot group may be set to the interval between the X consecutive slots, where d may be semi-statically configured by RRC signaling, etc. The default value of d may be predefined for each SCS. For example, d=0 may be predefined for a specific SCS.
1.3.1.1.2. For the 480 and 960 kHz SCSs, the slot group is implicitly determined according to each configured value of X.

For the 480 kHz SCS, if X=4, the slot group is aligned with a slot with the 120 kHz SCS.

For the 480 kHz SCS, if X=2, the slot group is aligned with a half-slot (7 symbols) with the 120 kHz SCS.

For the 960 kHz SCS, if X=8, the slot group is aligned with a slot with the 120 kHz SCS.

For the 960 kHz SCS, if X=4, the slot group is aligned with a slot with the 480 kHz SCS.

For the 960 kHz SCS, if X=2, the slot group is aligned with a half-slot (7 symbols) with the 480 kHz SCS.

1.3.1.1.3. In the methods described in Sections 1.3.1.1.1 and 1.3.1.1.2, if a different offset is configured for each UE, the starting point of the X-slot group may vary for each UE.
1.3.2. Method of determining sizes, locations, and number of Ys in X-slot group for each UE
1.3.2.1. The location and size of Y are determined at the slot level or by a symbol-level pattern (bitmap).
1.3.2.1.1. If the unit of Y is a slot, Y is configured by a slot-level bitmap.

For example, if the X-slot group is configured with 8 slots with the 960 kHz SCS, the bitmap needs to set to 01100000 in order to determine slots with indices 1 and 2 as Y. The corresponding bitmap may be semi-statically configured by higher layer signaling such as RRC or dynamically configured dynamically by DCI, etc.

1.3.2.1.2. If the unit of Y is a symbol, Y is configured by a symbol-level bitmap.

For example, when the X-slot group is configured with two slots with the 480 kHz SCS, the bitmap needs to be set to 11000000000000_11000000000000 in order to determine symbols with indices 0, 1, 14, and 15 as Y. The corresponding bitmap may be semi-statically configured by higher layer signaling such as RRC or dynamically configured by DCI, etc.

1.3.2.2. Method of restricting interval between adjacent Ys 1.3.2.2.1. When there are two or more Ys in the X-slot group (the unit of Y is a slot)

For two adjacent Ys, the minimum interval between the first slot of the former Y and the first slot of the latter Y may be set to k slots.

Alternatively, for two adjacent Ys, the minimum interval between the last slot of the former Y and the first slot of the latter Y may be set to k slots.

As long as the minimum interval is maintained, there is no limit to the size and position of Y.

The value of k is semi-statically configured by higher layer signaling such as RRC.

1.3.2.2.2. When there is only one Y in the X slot group (the unit of Y is a slot)

For two adjacent Ys, the minimum interval between the first slot of the former Y and the first slot of the latter Y may be set to (X−Y) slots.

For two adjacent Ys, the minimum interval between the last slot of the former Y and the first slot of the latter Y may be set to (X−Y) slots.

As long as the minimum interval is maintained, there is no limit to the size and position of Y.

1.3.2.2.3. When there are two or more Ys in the X slot group (the unit of Y is a symbol)

For two adjacent Ys, the minimum interval between the first symbol of the former Y and the first symbol of the latter Y may be set to k symbols.

For two adjacent Ys, the minimum interval between the last symbol of the former Y and the first symbol of the latter Y may be set to k symbols.

As long as the minimum interval is maintained, there is no limit to the size and position of Y.

The value of k is semi-statically configured by higher layer signaling such as RRC.

1.3.2.2.4. When there is only one Y in the X slot group (the unit of Y is a symbol)

For two adjacent Ys, the minimum interval between the first symbol of the former Y and the first symbol of the latter Y may be set to (14*X−Y) symbols.

For two adjacent Ys, the minimum interval between the last symbol of the former Y and the first symbol of the latter Y may be set to (14*X−Y) symbols.

As long as the minimum interval is maintained, there is no limit to the size and position of Y.

1.3.2.3. Method of configuring Y consecutive slots starting from reference slot (ref-slot) in X slot group 1.3.2.3.1. The reference slot may be configured by RRC signaling. If the reference slot is not set by the BS, the default reference slot of the UE may be the first slot.

1.3.2.3.2. If the size of Y is 1, Y is set to the reference slot. If the size of Y=k, Y is set to k consecutive slots starting from the reference slot.

1.3.2.3.3. However, to secure the PDCCH decoding time, the size of Y is configured such that the value of (X−Y) is less than a specific number c. The specific number c may be predefined for each SCS or configured by RRC signaling.

1.3.2.3.4. The reference slot may be one slot at a fixed position, or the reference slot may be two or more consecutive slots. For example, if the reference slot is two consecutive slots, the size of Y may be set to a multiple of 2 only.

1.3.2.4. Method of increasing/decreasing size of Y based on DCI or timer 1.3.2.4.1. The default size of Y is determined for each SCS (e.g., Y=8 for 960 kHz), and the size of Y may be changed from the default size to another size by DCI or a timer. The reference slot of Section 1.3.2.3 may be set as the default size. Alternatively, the default size may be set as the size of the reference slot.

1.3.2.4.2. Available sizes of Y may be configured for each SCS by RRC signaling, and the size of Y may be changed by DCI triggering.

1.3.2.4.3. If the size of Y is not the default size, the timer starts, and when the timer expires, the size of Y falls back to the default size.

1.3.3. Method of configuring X and Y for CSS separately from those of USS 1.3.3.1. The starting point of an X-slot group for a CSS is configured to be different from that of a USS.

The starting point of the X-slot group for the CSS is fixed to slot index modulo X=0, and the starting point of the X-slot group for the USS is configured for each UE.

The starting point of the X-slot group for the USS may be configured according to the method of Section 1.1-1.

1.3.3.2. The position/size of Y slots (or symbols) for a CSS is configured to be different from those for a USS.

The size of Y for the CSS is configured different from the size of Y for the USS.

Alternatively, the size of Y for the CSS is configured to be the same as that for the USS, but the position of Y for the CSS is configured to be different from that for the USS.

The positions/sizes of the CSS and USS may be configured according to the method of Section 1.2.

1.3.3.3. Method of configuring Y for CSS only (CSS only Y) or Y for USS only (USS only Y)

Y (Yc) configurable for the CSS only and/or Y (Yu) configurable for the USS only may be predefined.

In this case, the span gap and span duration for each of Yc and Yu may be configured independently.

Y simultaneously configurable for the CSS and USS (CSS+USS Y) may also be defined.

For example, for one UE, a specific Y may be set to USS only Y, and another specific Y may be set to CSS+USS Y, CSS only Y, or USS only Y.

1.3.4. BD/CCE handling and overbooking/dropping rules

In the following methods, the BD/CCE capability and/or limit may mean BD (the maximum number of monitored PDCCH candidates) and CCEs (the maximum number of non-overlapped CCEs) configurable by the BS/UE, which may be configured separately for each SCS.

If a unit to which the BD/CCE capability and/or limit is applied (which consists of one or more slots or symbols) (hereinafter such a unit is referred to as a BD/CCE unit) is defined and/or configured, the following BD/CCE processing methods are applicable to a plurality of slots and/or symbols belonging to the corresponding BD/CCE unit.

If the number of PDCCH candidates that the UE is configured and/or instructed to monitor according to the following the BD/CCE processing methods is greater than the capability and/or limit configured for the corresponding BD/CCE unit (overbooking), the UE may drop monitoring of PDCCH candidates in some slots and/or symbols (or related to some SS sets) according to a predetermined criterion (that is, the UE may not perform blind detection/decoding), thereby guaranteeing the BD/CCE capability in the corresponding BD/CCE unit.

In the following BD/CCE processing methods, a process of checking the presence of overbooking in the corresponding BD/CCE unit is referred to as a BD/CCE check. If it is determined by the BD/CCE check that the UE is not overbooked, the UE may not drop monitoring of all PDCCH candidates included in the unit/range (slots, symbols, or SS set indices) where the check is performed. If it is determined by the BD/CCE check that the UE is overbooked, the UE may drop monitoring of PDCCH candidates according to a specific criterion, and such a process is referred to as a BD/CCE drop.

1.3.4.1. When a slot group is defined as a plurality of X consecutive slots and when the slot group is configured in the BD/CCE unit, the UE may perform a BD/CCE processing operation according to one of the following methods.

1.3.4.1.1. The BD/CCE check is performed in units of slot groups. If it is determined by the check that the UE is overbooked, the UE performs the BD/CCE drop in descending order of slots, symbols, and/or SS set indices.

1.3.4.1.2. The BD/CCE check is performed in each slot and/or symbol included in a slot group. If it is determined by the check that the UE is overbooked, the UE performs the BD/CCE drop for the corresponding slots and/or symbols.

The UE starts the BD/CCE check for a slot and/or symbol with the lowest index. Then, the UE repeatedly performs the BD/CCE check while increasing the index (that is, the UE performs the BD/CCE check in order from the first slot to the last slot).

The UE starts the BD/CCE check for a slot and/or symbol with the highest index. Then, the UE repeatedly performs the BD/CCE check while decreasing the index (that is, the UE performs the BD/CCE check in order from the last slot to the first slot).

1.3.4.1.3. The BD/CCE check is performed in each SS set included in a slot group. If it is determined by the check that the UE is overbooked, the UE performs the BD/CCE drop in descending order of SS set indices.

1.3.4.1.4. The BD/CCE check is performed in units of slot groups. If it is determined by the check that the UE is overbooked, the UE performs the BD/CCE drop in each slot and/or symbol in descending order of SS set indices.

For example, when the slot group consists of two slots, if the BD/CCE check result indicates that the UE is overbooked, the UE may perform the BD/CCE drop as follows: the UE drops an SS set with the highest index in the first slot, drops an SS set with the highest index in the second slot, drops an SS set with the second highest index in the first slot, and then drops an SS set with the second highest index in the second slot.

In the present specification, an expression indicating the order such as a first slot, a second slot, etc. may mean any slot among a plurality of slots, but the expression may also be understood as an expression indicating the order of the plurality of slots in the time domain. For example, the following expression 'the first slot of 8 X slots' may mean any one of the 8 X slots, but it may mean the foremost slot among the 8 X slots in the time domain.

1.3.4.2. Y slots in a slot group may be configured in the BD/CCE unit, and the UE may perform the BD/CCE check based on the configured unit.

1.3.4.2.1. When the size of Y is not fixed, the BD/CCE limit in the Y slots may be set as an integer multiple (e.g., the number of Y slots) of the BD/CCE limit per slot (per-slot BD/CCE limit). Alternatively, the BD/CCE limit is configured based on the maximum size of Y, and then the BD/CCE limit may be changed suitable for the size of Y with respect to the maximum size (e.g., ½ times, ¼ times, etc.). Alternatively, the BD/CCE limit is configured based on the size of the reference slot, and then the BD/CCE limit may be changed suitable for the configured size of Y (e.g., 2 times, ½ times, etc.).

1.3.4.2.2. If Y slots are consecutive slots starting from the reference slot, the BD/CCE check is performed from the reference slot.

1.3.4.2.2.1. The BD/CCE check is performed in order of slot indices. After performing the BD/CCE check in the reference slot, the UE performs the BD/CCE drop while continuing the BD/CCE check in the order of slot indices. For example, when the reference slot is one slot, the BD/CCE check is performed in each slot. When the reference slot is two slots, the BD/CCE check is performed in units of two slots. The BD/CCE check for each reference slot means that the BD/CCE check is performed on all SS sets included in the reference slot unit, and then the BD/CCE check is performed on all the SS sets included in the next reference slot unit.

1.3.4.2.2.2. The BD/CCE check is performed in the order of SS set indices. The UE starts the BD/CCE check from an SS set with the lowest index where the MO is configured in the reference slot. Thereafter, the UE performs the BD/CCE check while continuing the BD/CCE check in the order of SS set indices. The BD/CCE check for each SS set index is performed for all Y slots.

1.3.4.2.3. If Y slots are any consecutive slots, the methods described in Section 1.3.4.1 may be applied to the Y slots. Further, the following methods may also be applied.

1.3.4.2.3.1. The UE performs the BD/CCE check from first m slots and then performs the BD/CCE check for next non-overlapping m slots (in the order of slot indices). When m>1, this method may be useful when per-slot BD/CCE is small. In addition, m=1.

1.3.4.2.3.2. The UE performs the BD/CCE check from last m slot and then performs the BD/CCE check for next m non-overlapping slots (in the reverse order of slot indices). When m>1, this method may be useful when per-slot BD/CCE is small. In addition, m=1.

1.3.4.2.4. If the size of Y is fixed and does not change, the UE sets Z slots as a new BD/CCE unit and performs the BD/CCE check in the Z slot unit (in order of index) from the slot with the lowest index. Alternatively, the UE may perform the BD/CCE check only for the Z slots among the Y slots and perform the BD/CCE drop for all other slots. Z may be set less than or equal to Y, which may be configured by RRC signaling.

1.3.4.3. For a BD/CCE unit in which a CSS and USS are configured at the same time, the UE may not perform the BD/CCE drop for the CSS, but the UE may perform the BD/CCE check and BD/CCE drop only for the USS according to the methods of Sections 1.3.4.1 to 1.3.4.2.

1.3.4.4. For a BD/CCE unit in which a CSS and USS are configured at the same time, the UE may perform the BD/CCE check for the CSS first according to the methods of Sections 1.3.4.1 to 1.3.4.2. Then, the UE may perform the BD/CCE check for the USS and then perform the BD/CCE drop.

1.3.4.5. The BS may configure a CSS such that the CSS does not exceed the BD/CCE limit within Y slots, and the UE may operate by expecting that the BS configures the CSS such that the CSS does not exceed the BD/CCE limit within the Y slots.

1.4. Case 2

1.4.1. Method of designating multi-slot group 1.4.1.1. Z consecutive slots may be configured as one multi-slot group.

1.4.1.1.1. Z may have a value more than or equal to X, or Z may be set to a multiple of X. Alternatively, Z may be set to be the length of a subframe (or half-subframe). If a span of (X, Y) is determined as a repetition pattern, the multi-slot group corresponds to a period in which the span pattern is repeated. In this specification, (X, Y) does not a supplementary description in parentheses, but may mean a combination of X and Y configured for the UE such as (X, Y) in Table 7.

1.4.1.1.2. Z is semi-statically configured by higher layer signaling such as RRC.

1.4.1.1.3. The default value for each of the 480 and 960 kHz SCSs may be predefined (e.g., Z=4 for 480 kHz and Z=8 for 960 kHz).

1.4.1.2. The starting point of a multi-slot group may be configured according to one of the following methods.

1.4.1.2.1. A point at which SFN modulo c=0 is determined as the starting point of the multi-slot group, where c may be semi-statically configured by RRC signaling, etc. The default value of c may be predefined for each SCS.

1.4.1.2.2. A point at which SFN=d is determined as the starting point of the multi-slot group, and the multi-slot group is configured at an interval of Z consecutive slots, where d may be semi-statically configured by signaling such as RRC. The default value of d may be predefined for each SCS.

1.4.1.2.3. The multi-slot group may be configured at an interval of Z slots from the starting point of a subframe (or half subframe).

1.4.2. Method of configuring X and Y for CSS separately from those of USS 1.4.2.1. (X, Y) for a CSS and (X, Y) for a USS may be configured independently.

1.4.2.1.1. The UE reports a plurality of (X, Y) pairs for the CSS and a plurality of (X, Y) pairs for the USS.

1.4.2.2. X for the CSS may be set different from that for the USS.

1.4.2.2.1. X for the CSS may be set greater than or smaller than X for the USS, thereby reducing the probability that the CSS and USS are simultaneously processed by each UE.

1.4.2.3. The duration of Y (slot or symbol) for a CSS may be set different from that for a USS.

1.4.2.3.1. The duration of Y for the CSS may be set greater than or smaller than the duration of Y for the USS, thereby reducing the probability that the CSS and USS are simultaneously processed by each UE.

1.5. Configuration of Locations of Y Slots (=PDCCH Monitoring Slots) Within X Slots Multi-slot PDCCH monitoring for the 480 and/or 960 kHz SCS, which is introduced for NR bands above 52.6 GHz, may be represented by X slots and Y slots. A BD/CCE budget (or BD/CCE limit) of the multi-slot PDCCH monitoring is defined in units of X and/or Y consecutive slots, where the Y slots may be some of the X slots. The PDCCH monitoring is not performed in slots not included in the Y slots among the X slots.

Figure 4:
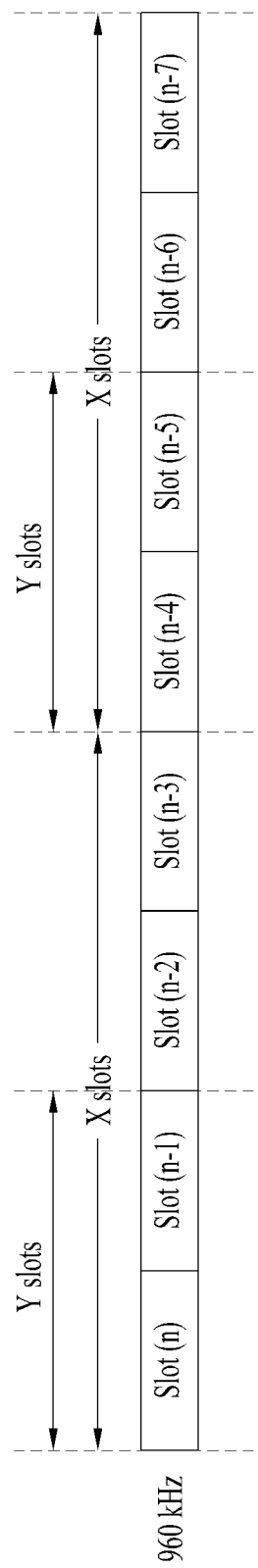
FIGS. 4 to 7 are diagrams for explaining a signal monitoring method according to an embodiment of the present disclosure.

For the efficiency of the multi-slot PDCCH monitoring (e.g., power consumption of the UE), it is necessary to properly configure the positions of the Y slots within the X slots. For example, FIG. 4 illustrates an example in which for 8 consecutive slots with the 960 kHz SCS, X slots are four slots and Y slots are two slots. In FIG. 4, the Y slots consist of two consecutive slots from the first slot among four slots included in the X slots.

Figure 5:
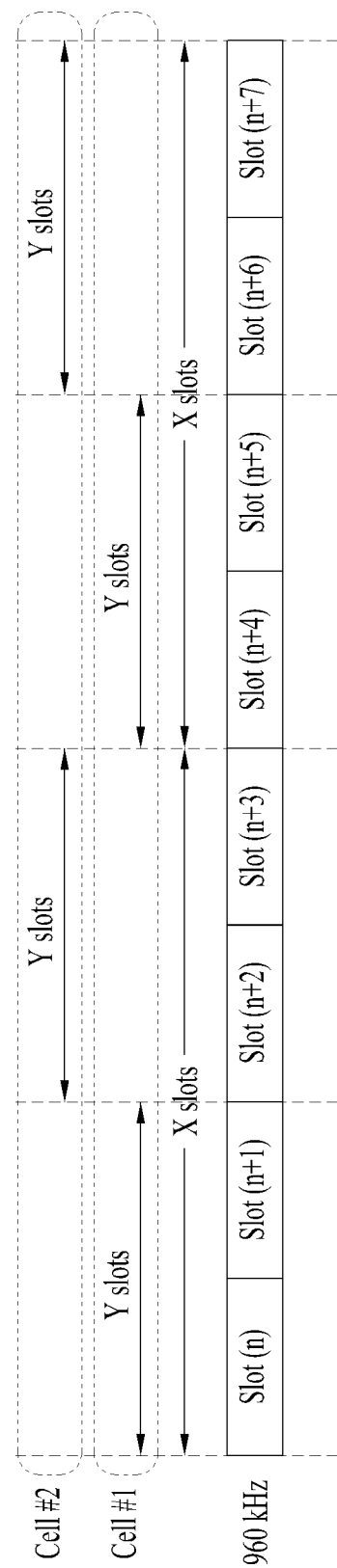

When the positions of the Y slots are configured as shown in FIG. 4, the UE may not perform PDCCH monitoring in the third and fourth slots among the X slots, thereby reducing power consumption. However, if the positions of the Y slots configured for the UE are not fixed to specific positions among the X slots and vary for the X slots unlike FIG. 4, the UE may not reduce the power consumption. In addition, even when the positions of the Y slots are fixed to the same positions for all X slots, if Y is large enough to approximate X, the power consumption of the UE may not be reduced. For example, if Y is 3, the UE needs to perform the PDCCH monitoring for more slots compared to when Y is 2. In addition, when Y slots are configured to have different positions for each cell, carrier and/or component carrier (CC) allocated to the UE as shown in the example of FIG. 5, the UE may not perform PDCCH monitoring within X slots, thereby remarkably reducing a duration in which power consumption may be reduced.

Section 1.5 proposes methods of configuring the positions of Y slots within X slots in multi-slot PDCCH monitoring for the 480 and 960 kHz SCSs. In each of the following methods, the positions of Y slots may be the same in any X slots or may vary. In each of the following methods, it may be assumed that the positions of X slots are aligned with each other in the time domain for each cell, carrier and/or CC, but the application of the proposed methods is not necessarily limited thereto. In addition, in each of the following methods, it may be assumed that (at least) the starting positions of X slots are aligned for different SCSs or different X values, but the application of the proposed methods is not necessarily limited thereto.

1.5-1. The first one of the Y slots is restricted so as not to be positioned later in the time domain than a specific one of the X slots. In an embodiment, the position of the first one of the Y slots may be limited not to exceed an (X/2)-th slot. For example, when X is set to 8 for the 960 kHz SCS (when the X slots consist of {slot #n, slot #(n+1), . . . , slot #(n+7)}), the position of the first one of the Y slots is configured not to exceed the fourth slot. Accordingly, the first one of the Y slots may be located in one of the first to fourth slots among the X slots, but the first one of the Y slots may not be located in one of the fifth to eighth slots among the X slots. The position of a specific slot may be predefined for each SCS and/or each size of X or may be configured by higher layer signaling such as RRC. In addition, the position of the specific slot may be reported by the UE to the BS as UE capability for each SCS and/or each size of X.

1.5-2. The last one of the Y slots is restricted so as not to be positioned later in the time domain than a specific one of the X slots. In an embodiment, the position of the last slot of the Y slots may be limited not to exceed an (X/2)-th slot. For example, when X is set to 8 for the 960 kHz SCS (when the X slots consist of {slot #n, slot #(n+1), . . . , slot #(n+7)}), the position of the last slot of the Y slots is configured not to exceed the fourth slot. For example, regardless of the position of the first one of the Y slots, the last one of the Y slots is set to one of slot #n, slot #(n+1), slot #(n+2), and slot #(n+3). The position of a specific slot may be predefined for each SCS and/or each size of X or may be configured by higher layer signaling such as RRC. In addition, the position of the specific slot may be reported by the UE to the BS as UE capability for each SCS and/or each size of X.

1.5-3. The position of the last one of the Y slots is limited according to the position of the first one of the Y slots. That is, if the first one of the Y slots is slot #n, the last one of the Y slots is limited not to be positioned after slot #(n+M). In this case, slot #n may be located at the position of the first one of the Y slots or may mean a slot in which the first one of the Y slots is located. For example, when Y=1, Y may be located anywhere between slot #n and slot #(n+M). M may be predefined for each SCS and/or each size of X or may be configured by higher layer signaling such as RRC. In addition, M may be reported to the BS by the UE as UE capability for each SCS and/or each size of X. M may be predefined as X/2 for the 480 and/or 960 kHz SCS. In an embodiment, when the first one of the Y slots is located at slot #n among the X slots, the last one of the Y slots may be one of slot #(n+1), slot #(n+2), ..., and slot #(n+X/2). The last one of the Y slots may not be located at or after slot #(n+X/2+1). For example, for the 960 kHz SCS, when X is set to 8 and M is set to X/4, if the first one of the Y slots is the first one of the X slots, the last one of the Y slots may be the first, second, or third one of the X slots.

1.5-4. If there are a plurality of cells, CCs and/or carriers configured for one UE, the position of Y for all CCs configured for the one UE may be limited by one of Sections 1.5-1, 1.5-2, and 1.5-3 (or any combination of two or more thereof). For the plurality of CCs configured for the UE, the worst position (i.e., the rearmost position) of Y among the positions of Y in each CC may be limited such that the worst position is not behind a specific one of X slots. According to Section 1.5-2, if the number of CCs for a specific UE is 3, X is 8, and the position of the last one of the Y slots is set to X/2=4 regardless of SCSs, the position of the last one of the Y slots for CC #1 may not be behind the fourth one of the X slots (8 slots), i.e., slot #3. This restriction is equally applied to CC v#2 and CC #3. Section 1.5-4 may be applied even when the SCS configuration varies for each CC. Further, Section 1.5-4 may be used to configure positions of Y slots within X slots in combination with Section 1.5-5 to be described later.

Figure 6:
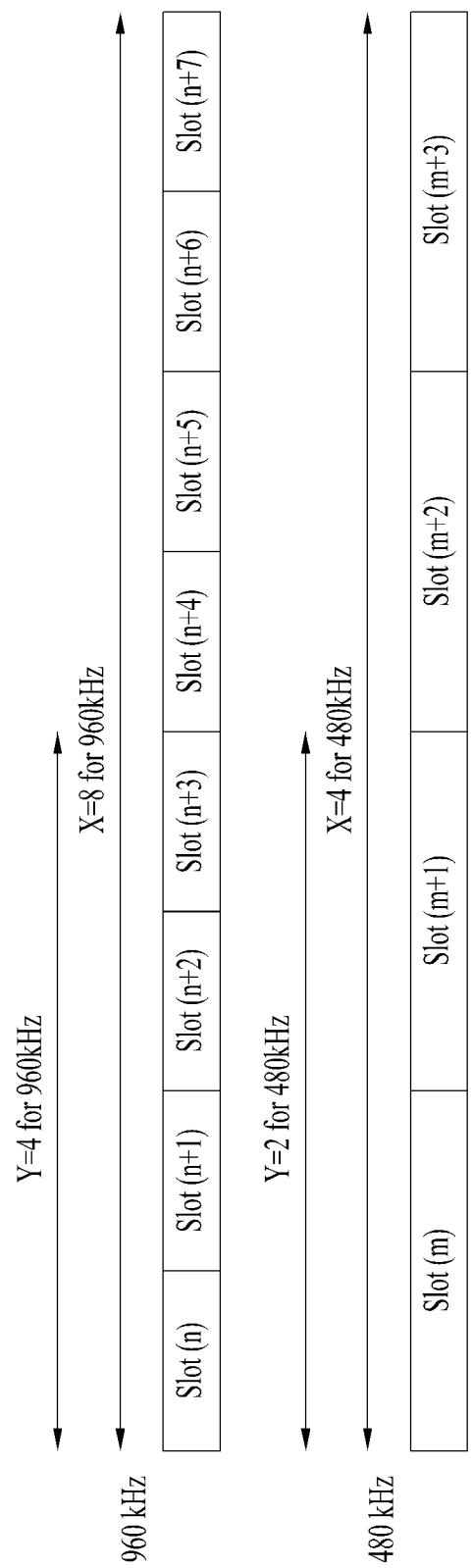

1.5-5. When two or more SCSs are configured for one UE, a range in which the position of Y is configured for each SCS (or for each value of X configured for each SCS) may be restricted such that the range has the same ratio within the X slots for each SCS. When different SCSs (and slot durations) are mixed and when X has a different value for each SCS, the location may be limited such that the values of Y configured for each SCS (and the values of X) overlaps as much as possible. For example, when a specific UE is configured with SCSs of 480 kHz and 960 kHz, if X is set to 4 for the 480 kHz SCS and 8 for the 960 kHz SCS, the position of Y may be limited to the first two slots of X for the 480 kHz SCS and the first four slots of X for the 960 kHz SCS as shown in FIG. 6.

Accordingly, the UE may expect that the power consumption is reduced even in a mixed SCS situation.

The method of Section 1.5-5 may be used even when a plurality of cells, carriers and/or CCs are configured with different SCSs. In Section 1.5-5, one of Sections 1.5-1, 1.5-2, and 1.5-3 (or any combination of two or more thereof) may be used as the restriction (or configuration) of the Y position for each SCS. The operation of Section 1.5-5 may be used in combination with the same restriction (or configuration) of the Y position for a plurality of CCs as described in Section 1.5-4.

The operations of Sections 1.5-1 to 1.5-5 may be preconfigured and then applied when determining the position of Y for each cell, carrier, and/or CC, for each SCS, or for each value of X. Alternatively, the operations of Sections 1.5-1 to 1.5-5 may be used as additional restrictions, regardless of the position and/or size of Y configured for each carrier and/or CC, for each SCS, or for each value of X. For example, even when Y slots are set to three consecutive slots from the first one of X slots by a UE capability report and a network configuration after X is set to 4 (that is, when Y slots are slot #n, slot #(n+1), and slot #(n+2)), if the following restriction is added according to Section 1.5-2: the last one of the Y slots is not configured after the second one of the X slots, the UE may operate by considering (assuming or configuring) only slot #n and slot #(n+1) as the Y slots, independently of the BS configuration.

1.6. Method of Configuring X Slots and Y Slots

For multi-slot PDCCH monitoring for the 480 and/or 960 kHz SCS, if Y slots are configured within X slots, the position of Y (i.e., the position of the first or last slot), the size of Y (i.e., the number of consecutive slots from the first slot to the last slot), and the method of limiting the range of Y described in Section 1.5 may be considered.

1.6-1. If the value of X for the 480 kHz SCS (that is, the number of slots) is set to A, the value of X for the 960 kHz SCS may be set to 2*A. On the other hand, if the value of X for the 960 kHz SCS is set to B, the value of X for the 480 kHz may be set to B/2.

1.6-2. If the value of Y for the 480 kHz SCS (that is, the number of slots) is set to C, the value of Y for the 960 kHz SCS may be set to 2*C. On the other hand, if the value of Y for the 960 kHz SCS is set to D, the value of Y for the 480 kHz SCS may be set to D/2.

The position of the X slots and the position of the Y slots may be determined based on one of the operations described in Sections 1.5 and 1.6 or any combination thereof.

Implementations

Figure 7:
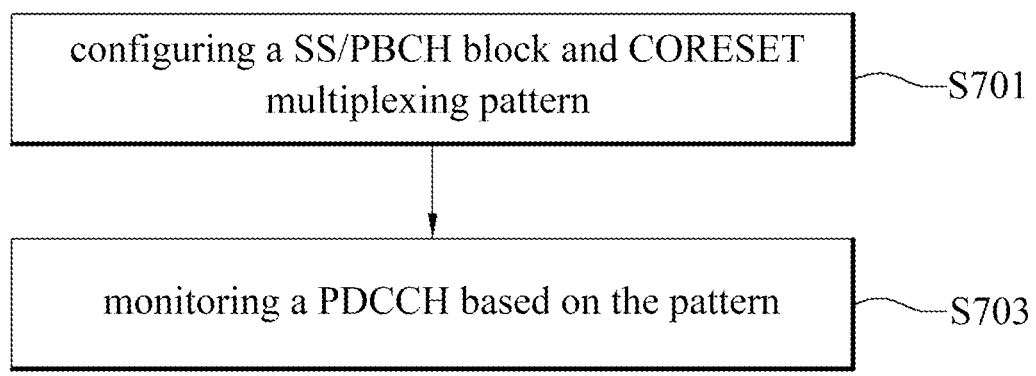

FIG. 7 is a flowchart of a signal monitoring method according to embodiments of the present disclosure.

Referring to FIG. 7, an embodiment performed by the UE may include: configuring an SS/PBCH block and CORESET multiplexing pattern (S701); and monitoring a PDCCH based on the pattern (S703).

The PDCCH monitoring may be performed based on one or more of the operations described in Section 1.

For example, according to Section 1.1, the SS/PBCH block and CORESET multiplexing pattern may be set to pattern 1. The PDCCH may be monitored in a Type0-PDCCH CSS set. The PDCCH may be monitored in first slots of two consecutive slot groups. If one slot group includes G consecutive slots, the interval between two slots each including a PDCCH MO becomes a G-slot interval. G may be 4 for the 480 kHz SCS and 8 for the 960 kHz SCS. Accordingly, the slot interval between two slots for monitoring a Type0-PDCCH may be a 4-slot interval for the 480 kHz SCS and an 8-slot interval for the 960 kHz SCS.

The operation of Section 1.1 may be performed in both a licensed band and/or an unlicensed band. The unlicensed band may be referred to as a shared spectrum. When the UE monitors the PDCCH based on operation with shared spectrum channel access (i.e., unlicensed band operation), the slot interval is configured for SS/PBCH block candidates. When the UE monitors the PDCCH based on operation without shared spectrum channel access (i.e., licensed band operation), the slot interval is configured for SS/PBCH blocks.

Referring to Sections 1.2 to 1.6, the PDCCH monitoring may be performed based on configurations of X slots and Y slots. Referring to Table 7, when X consecutive slots are defined as a first slot group and Y consecutive slots are defined as a second slot group, first slot groups may be consecutive and non-overlapping. In addition, one second slot group is included in each first slot group. Considering that Section 1 of the present specification relates to multi-slot PDCCH monitoring proposed in consideration of shortened symbol lengths for the 480 and 960 kHz SCSs, the first and second slot groups may be configured for the 480 and/or 960 kHz SCS.

Referring to Section 1.2-1, each of the first and second slot groups may include at least one PDCCH MO. Thus, the PDCCH may be monitored in at least one of the X slots included in the first slot groups. In addition, the PDCCH may be monitored in at least one of the Y slots included in the second slot groups.

Referring to section 1.3, since the X slots may be configured for a CSS and/or a USS, one of the two slots configured for the Type0-PDCCH CSS set may be included in the first slot group. According to section 1.1, since the two slots configured for the Type0-PDCCH CSS set belong to different slot groups, the two slots may be included one by one in two first slot groups.

According to Section 1.3.3.1, the X slots may be configured for a CSS and/or a USS. If an SS set identified by the X slots is defined as a first SS set, the first SS set may be a CSS set or a USS set. According to Sections 1.3.3.2 and 1.3.3.3, the Y slots may be configured for a CSS and/or a USS, independently of limitations on the SS set for the X slots. If an SS set identified by the Y slots is defined as a second SS set, the second SS set may be a CSS set or a USS set.

According to Section 1.3.2.2.2, if one Y (one second slot group) is included in an X-slot group (first slot group), for two adjacent Ys (two second slot groups), the interval between the last slot of the former Y (former second slot group) and the first slot (starting slot) of the latter Y (latter second slot group) may be set to X−Y slots. Since the interval between the last slot of the former second slot group and the starting slot of the latter second slot group among the two adjacent second slot groups is an interval of X−Y slots, the interval between the starting slot of the former second slot group and the starting slot of the latter second slot group becomes an X-slot interval.

The operations described with reference to FIG. 7 may be additionally performed in combination with at least one of the operations described with reference to FIGS. 1 to 3 and/or the operations described in Section 1.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 8:
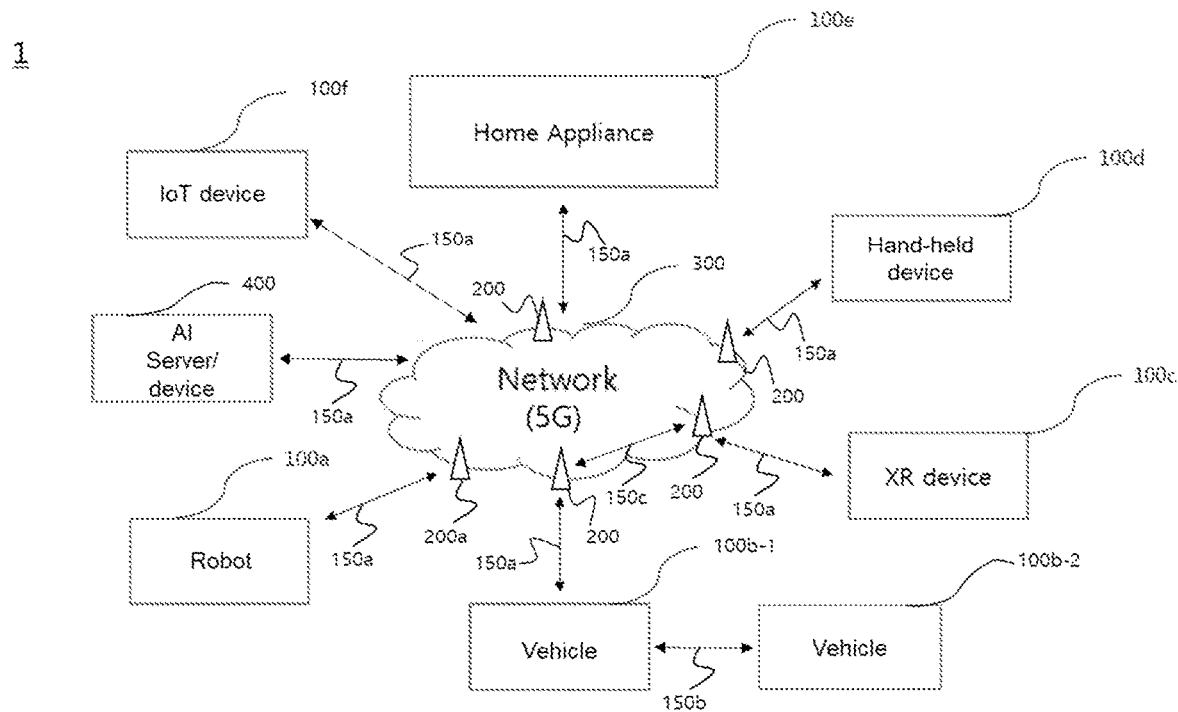
FIGS. 8 to 11 illustrate devices according to an embodiment of the present disclosure.

FIG. 8 illustrates a communication system 1 applied to the present disclosure.

Referring to FIG. 8, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the B Ss 200/network 300, the wireless devices 100a to 100f may perform direct communication (e.g., sidelink communication) with each other without intervention of the BSs/network. For example, the vehicles 100b-1 and 100b-2 may perform direct communication (e.g., V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 9:
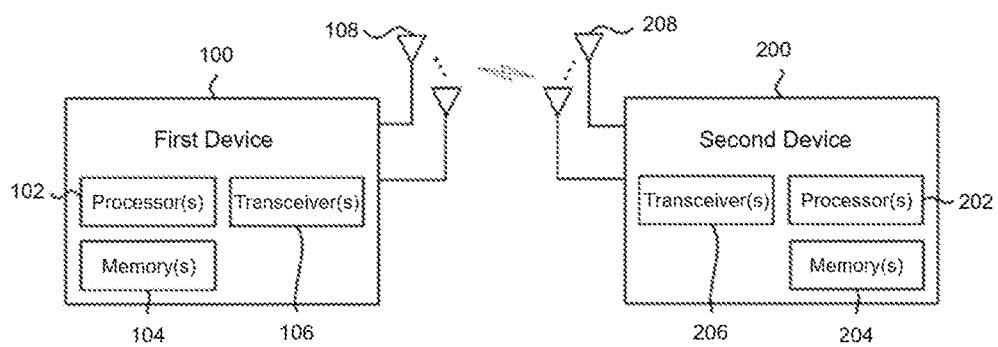

FIG. 9 illustrates wireless devices applicable to the present disclosure.

Referring to FIG. 9, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 8.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/ channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 10:
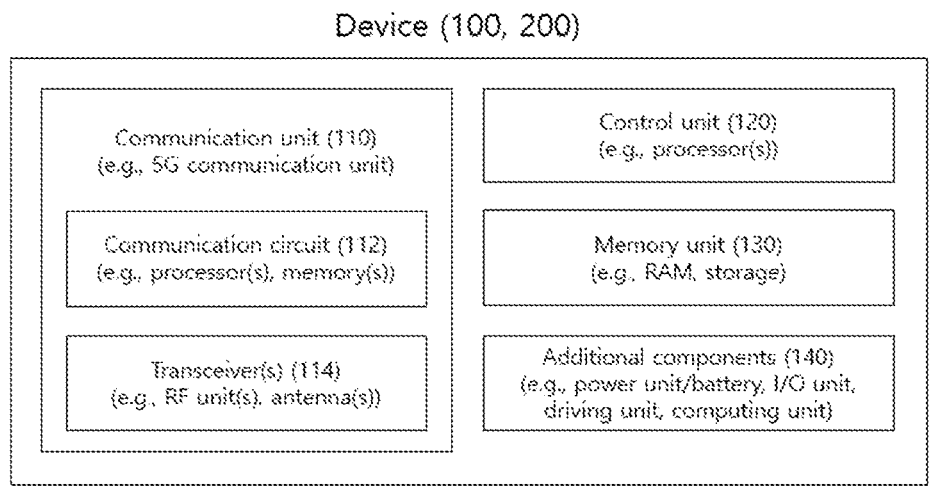

FIG. 10 illustrates another example of a wireless device applied to the present disclosure. The wireless device may be implemented in various forms according to a use case/ service (refer to FIG. 8).

Referring to FIG. 10, wireless devices 100 and 200 may correspond to the wireless devices 100 and 200 of FIG. 9 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 9. For example, the transceiver(s) 114 may include the one or more transceivers 106 and 206 and/or the one or more antennas 108 and 208 of FIG. 9. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 8), the vehicles (100b-1 and 100b-2 of FIG. 8), the XR device (100c of FIG. 8), the hand-held device (100d of FIG. 8), the home appliance (100e of FIG. 8), the IoT device (100f of FIG. 8), a digital broadcasting terminal, a hologram device, a public safety device, an MTC device, a medical device, a FinTech device (or a finance device), a security device, a climate/environment device, the AI server/ device (400 of FIG. 8), the BSs (200 of FIG. 8), a network node, or the like. The wireless device may be mobile or fixed according to a use case/service.

In FIG. 10, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 11:
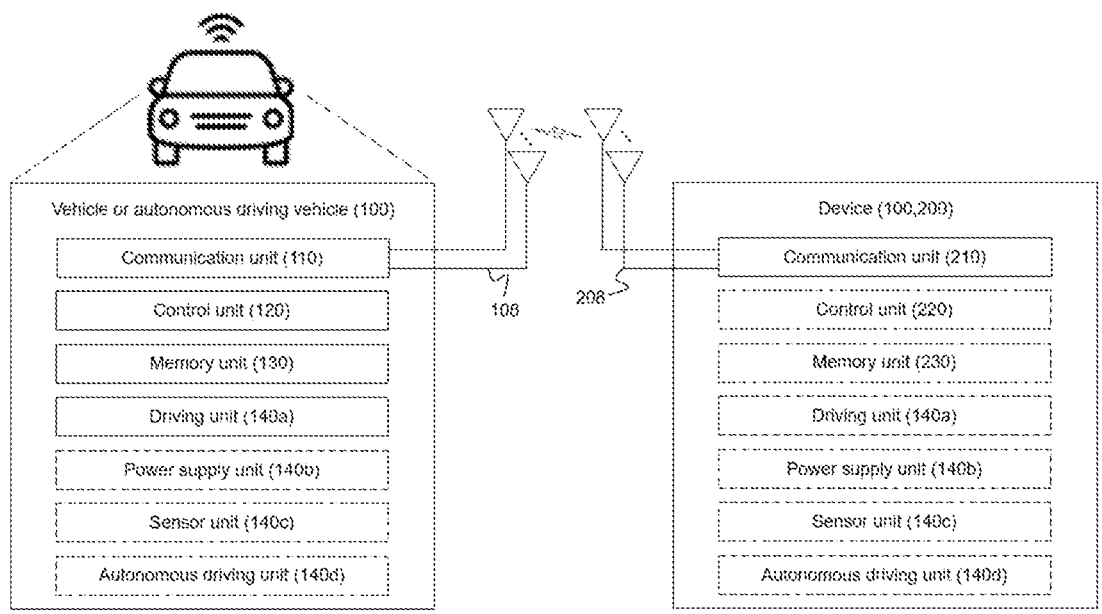

Example of Vehicle or Autonomous Driving Vehicle to which the Present Disclosure is Applied FIG. 11 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 11, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 10, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

The invention claimed is:

1. A method of monitoring a control signal by a user equipment (UE) operating in a wireless communication system, the method comprising:
configuring a synchronization signals and physical broadcast channel (SS/PBCH) block and control resource set (CORESET) multiplexing pattern as pattern 1; and
based on the pattern 1, monitoring a physical downlink control channel (PDCCH) in a type0-PDCCH common search space (CSS) set over two slots,
wherein a slot interval between the two slots is 4 slots based on a 480 kHz subcarrier spacing (SCS) and the slot interval between the two slots is 8 slots based on a 960 kHz SCS.

2. The method of claim 1, wherein, based on an operation with a shared spectrum channel access, the slot interval is configured for a candidate SS/PBCH block.

3. The method of claim 1, wherein, based on the UE monitoring the PDCCH without a shared spectrum channel access, the slot interval is configured for a SS/PBCH block.

4. The method of claim 1, wherein one of the two slots for the type0-PDCCH CSS set is included in a first slot group comprised of consecutive X slots.

5. The method of claim 4, wherein a PDCCH in a first search space (SS) set is monitored in one of the X slots.

6. The method of claim 5, wherein the first SS set is a CSS set.

7. The method of claim 5, wherein the first slot group includes a second slot group comprised of consecutive Y slots for monitoring a PDCCH in a second SS set.

8. The method of claim 7, wherein, based on the 480 kHz SCS or the 960 kHz SCS, the monitoring is performed based on first slot groups including the first slot group and second slot groups including the second slot group, and
wherein one of the second slot groups is included per one of the first slot groups.

9. The method of claim 8, wherein start of two consecutive second slot groups is separated by X slots.

10. The method of claim 7, wherein a PDCCH in a second SS set is monitored in one of the Y slots.

11. The method of claim 10, wherein the second SS set is a CSS set.

12. The method of claim 10, wherein the second SS set is a UE-specific search space (USS) set.

13. A user equipment (UE) configured to transmit an uplink signal in a wireless communication system, the UE comprising:
at least one transceiver;
at least one processor; and
at least one memory operably connected to the at least one processor and configured to store instructions that, when executed, cause the at least one processor to perform operations comprising:
configuring a synchronization signals and physical broadcast channel (SS/PBCH) block and control resource set (CORESET) multiplexing pattern as pattern 1; and based on the pattern 1, monitoring a physical downlink control channel (PDCCH) in a type0-PDCCH common search space (CSS) set over two slots, wherein a slot interval between the two slots is 4 slots based on a 480 kHz subcarrier spacing (SCS) and the slot interval between the two slots is 8 slots based on a 960 kHz SCS.

14. An apparatus for a user equipment (UE), the apparatus comprising:
at least one processor; and
at least one computer memory operably connected to the at least one processor and configured to, when executed, cause the at least one processor to perform operations comprising:
configuring a synchronization signals and physical broadcast channel (SS/PBCH) block and control resource set (CORESET) multiplexing pattern as pattern 1; and
based on the pattern 1, monitoring a physical downlink control channel (PDCCH) in a type0-PDCCH common search space (CSS) set over two slots,
wherein a slot interval between the two slots is 4 slots based on a 480 kHz subcarrier spacing (SCS) and the slot interval between the two slots is 8 slots based on a 960 kHz SCS.

15. A non-volatile computer-readable storage medium including at least one computer program that causes at least one processor to perform operations,
wherein the operations comprise:
configuring a synchronization signals and physical broadcast channel (SS/PBCH) block and control resource set (CORESET) multiplexing pattern as pattern 1; and
based on the pattern 1, monitoring a physical downlink control channel (PDCCH) in a type0-PDCCH common search space (CSS) set over two slots,
wherein a slot interval between the two slots is 4 slots based on a 480 kHz subcarrier spacing (SCS) and the slot interval between the two slots is 8 slots based on a 960 kHz SCS.

* * * * *